No. 742,838. PATENTED NOV. 3, 1903.
L. W. COCK.
MEANS FOR FUMIGATING.
APPLICATION FILED DEC. 10, 1894.
NO MODEL. 5 SHEETS—SHEET 1.

Witnesses:
A. M. Belfield.
L. A. Gardiner.

Inventor:
Lewis W. Cock
by Nice & Nice Attys.

No. 742,838. PATENTED NOV. 3, 1903.
L. W. COCK.
MEANS FOR FUMIGATING.
APPLICATION FILED DEC. 10, 1894.
NO MODEL. 5 SHEETS—SHEET 2.

Witnesses:
A. M. Belfield
L. A. Gardiner

Inventor:
Lewis W. Cock
by Hill & Hill Att'ys.

No. 742,838. PATENTED NOV. 3, 1903.
L. W. COCK.
MEANS FOR FUMIGATING.
APPLICATION FILED DEC. 10, 1894.
NO MODEL. 5 SHEETS—SHEET 3.

Witnesses:
A. M. Belfield.
L. H. Gardiner.

Inventor:
Lewis W Cock
by Nice & Nice Att'ys.

No. 742,838. PATENTED NOV. 3, 1903.
L. W. COCK.
MEANS FOR FUMIGATING.
APPLICATION FILED DEC. 10, 1894.
NO MODEL. 5 SHEETS—SHEET 4.

Witnesses:
A. M. Belfield.
L. A. Gardiner.

Inventor:
Lewis W. Cock
by Niel & Niel Attys.

No. 742,838. PATENTED NOV. 3, 1903.
L. W. COCK.
MEANS FOR FUMIGATING.
APPLICATION FILED DEC. 10, 1894.
NO MODEL. 5 SHEETS—SHEET 5.

Witnesses:
A. M. Belfield
L. A. Gardiner

Inventor:
Lewis W. Cock
by Nice & Nice Attys.

No. 742,838. Patented November 3, 1903.

UNITED STATES PATENT OFFICE.

LEWIS W. COCK, OF SAN MARCOS, TEXAS, ASSIGNOR, BY DIRECT AND MESNE ASSIGNMENTS, TO THE ACME FUMIGATOR COMPANY, OF CHICAGO, ILLINOIS, A CORPORATION OF ILLINOIS.

MEANS FOR FUMIGATING.

SPECIFICATION forming part of Letters Patent No. 742,838, dated November 3, 1903.

Application filed December 10, 1894. Serial No. 531,373. (No model.)

*To all whom it may concern:*

Be it known that I, LEWIS W. COCK, a citizen of the United States of America, residing at San Marcos, in the county of Hays, State of Texas, have invented certain new and useful Improvements in Means for Fumigating, of which the following is a specification.

Figure 1:
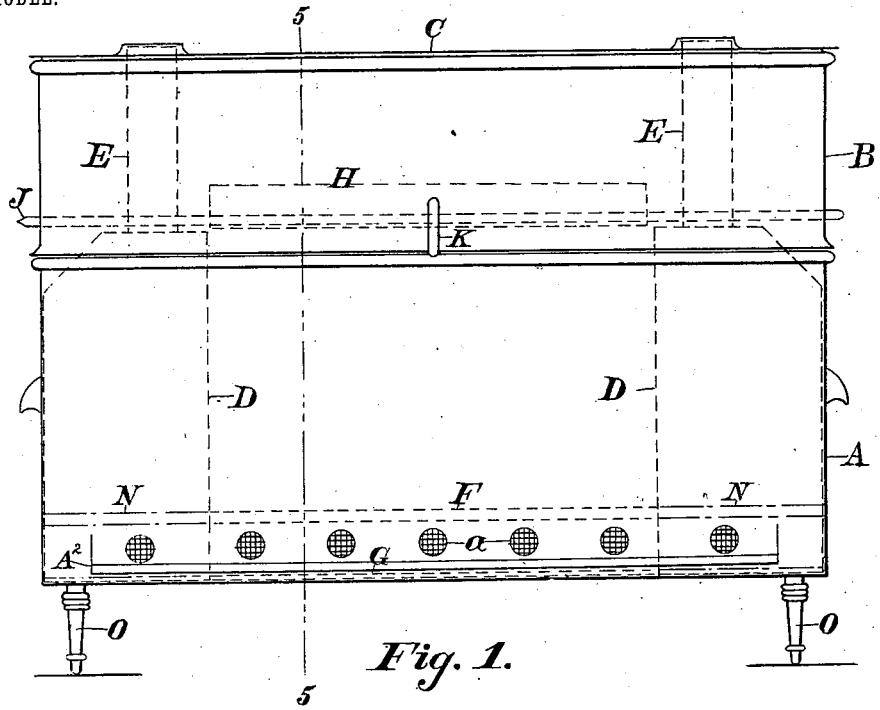
Figure 2:
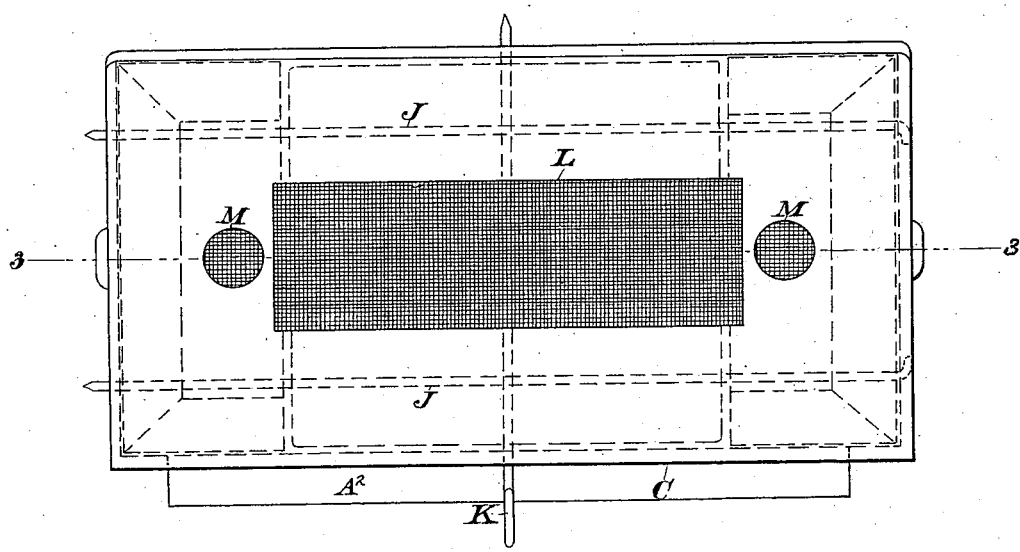
Figure 3:
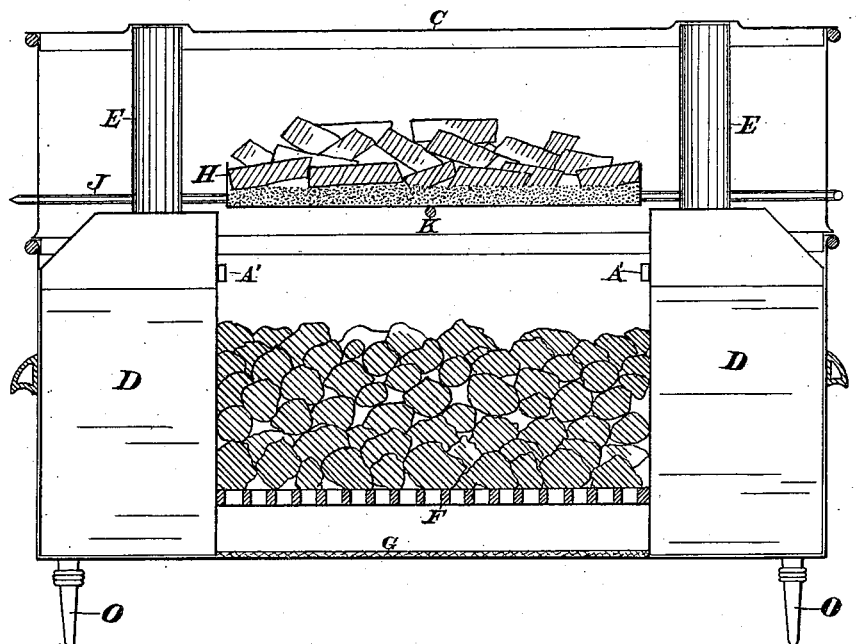
Figure 4:
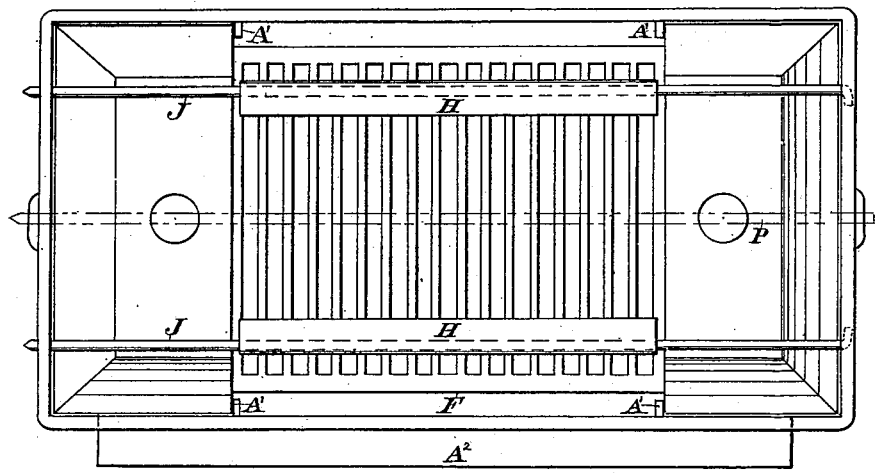
Figure 5:
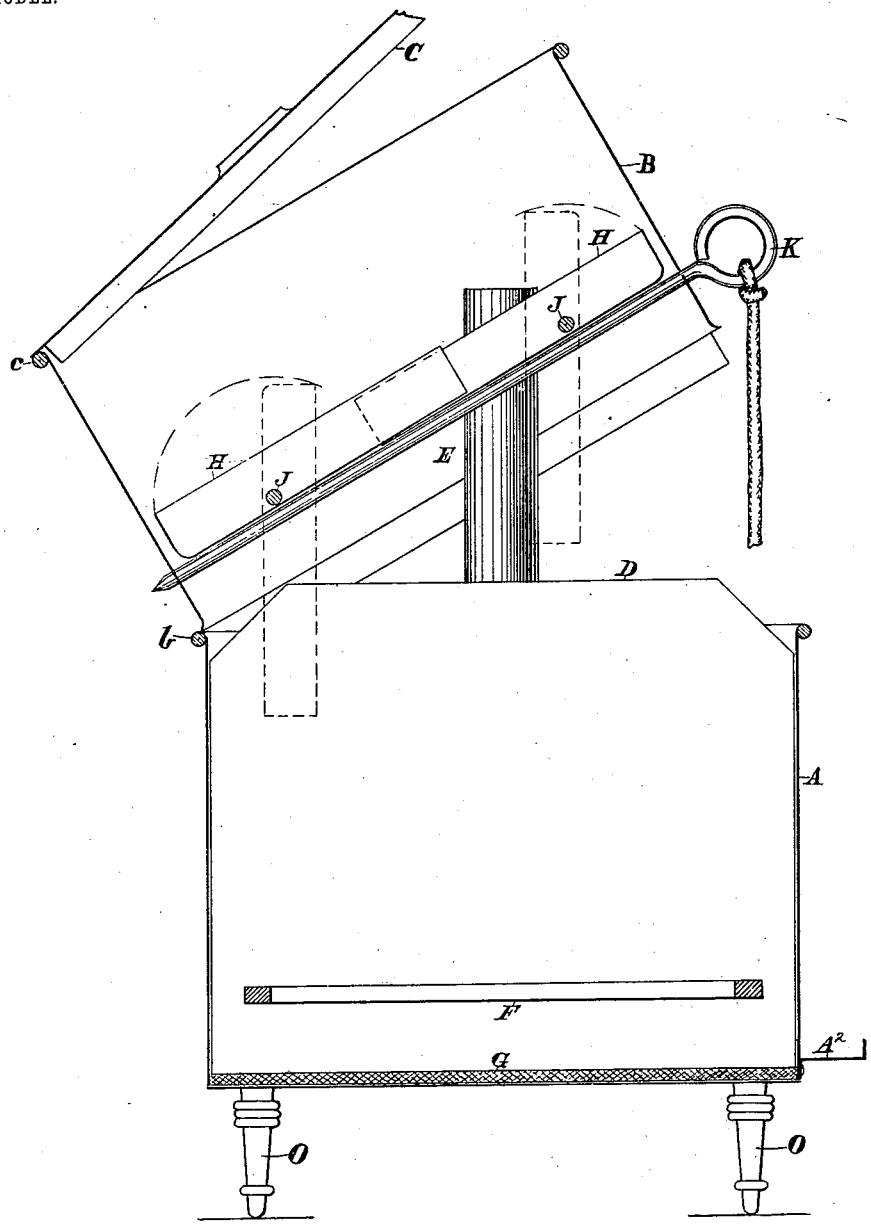
Figure 6:
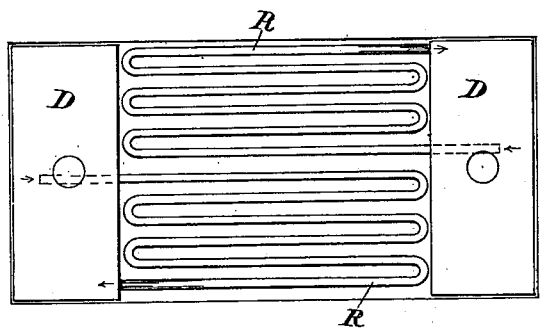
Figure 7:
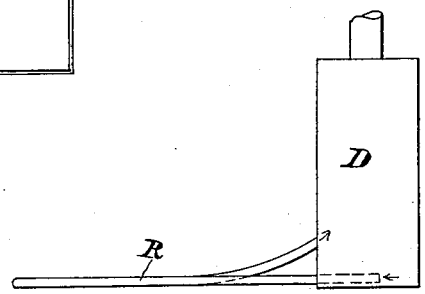
Figure 8:
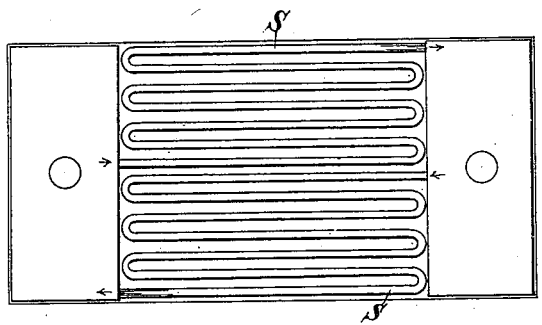
Figure 10:
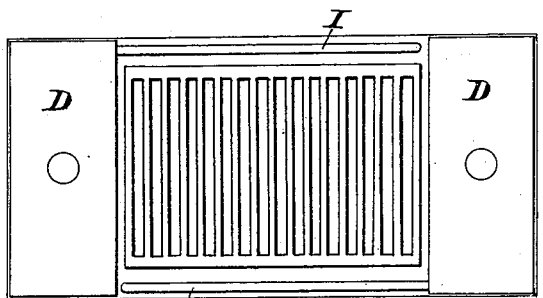
Figure 9:
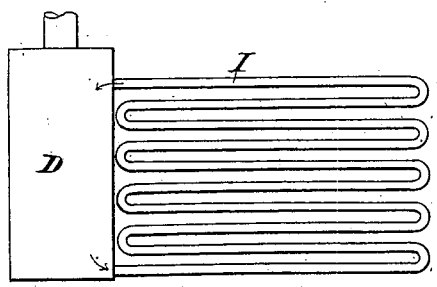
Figure 11:
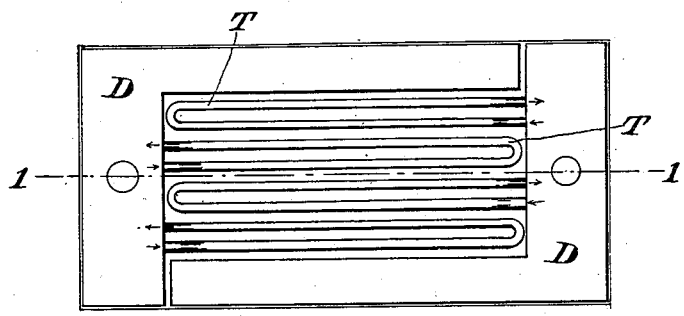
Figure 12:
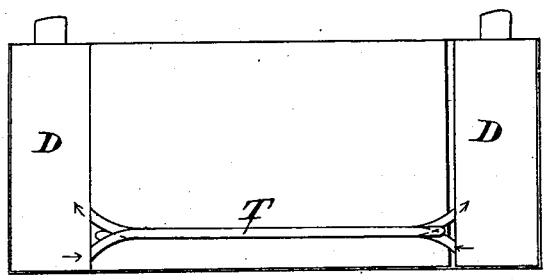
Figure 13:
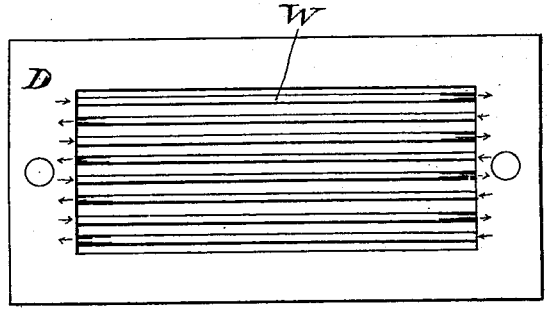

Referring to the accompanying drawings, wherein like reference-letters indicate like or corresponding parts, Figure 1 is a side elevation of the preferred form of my improved device, the internal construction being shown in dotted lines. Fig. 2 is a top plan of the same. Fig. 3 is a longitudinal section on line 3 3 of Fig. 2. Fig. 4 is a top plan of the device with the cover removed. Fig. 5 is a transverse section in line 5 5 of Fig. 1 with the top part partially raised the better to show the construction. Fig. 6 is a top plan showing a modified form in which each vessel has a grate-section of piping attached to aid in the circulation and rapid evaporation of the fluid. Fig. 7 is a side elevation of one of such vessels. Fig. 8 is a top plan of another modification in which the two vessels are united by coils of piping. Fig. 9 is a side elevation of one form in which the vessels may be constructed with coils of pipes to form a water-front or a water-back. Fig. 10 is a top plan of such vessels in position. Fig. 11 is a top plan of a form of vessel in which each extends along the side to form a water front or back and each has also one or more sections of piping to form the grate to aid in the circulation and rapid evaporation of the fluid. Fig. 12 is a vertical section of the same, and Fig. 13 is a top plan of a form in which the single vessel is a water-jacket surrounding the fire and the grate is formed by piping.

The beneficial results arising from dry fumigation are well understood as are also those arising from the use of fluid antiseptic mixtures. The means for securing the best results from the use of either has not been well understood heretofore. There are also great benefits to be derived from the combined use of both methods; and the object of this invention is to provide means or apparatus for fumigating in accordance with the method indicated.

In the preferred means shown in the drawings, A is a box, preferably of metal, having an upper section B, hinged at $b$. The section B is also provided with a cover C, hinged at $c$. At each end is placed a removable vessel D, which may be of any desired form, but preferably fits snugly within the ends of the box and are retained in position by any preferred means—for example, the lugs A'. The vessels are provided with pipes E, preferably extending upward, through which they may be filled or charged and the vapors escape. Extending from one vessel to the other is a removable grate F, elevated slightly above the bottom of the box to permit the draft through the apertures $a$ to pass beneath the bed of coals supported by the grate. The apertures are preferably covered with netting. If preferred, the grate may extend the full length of the box, as shown at N in dotted lines, and the vessels rest thereon or be supported above the same, allowing the fire to extend under them.

The section B fits closely upon the box A, as shown in Fig. 5. In the form shown rods J extend longitudinally through the section or through the box A, if preferred, to which are pivoted the swinging shelves H. A transverse removable rod K passes from side to side beneath the shelves H and supports them in the position shown in full lines, Fig. 5. When the rod K is removed, the shelves swing downward into a vertical position, (shown in dotted lines, Fig. 5,) discharging their contents upon the grate F. Any other latch device may be used in lieu of the rod K, if desired, the preference being given to the rod because of its simplicity and cheapness.

The cover C is provided with one or more openings L M to permit the escape of the fumes and vapors, and such openings are preferably covered with fine netting to prevent the escape of fine sparks from the heating medium.

The entire device is preferably mounted upon legs O to raise it above the floor. The bottom of the box and, if desired, the two sides also or other portions may be provided with a lining of asbestos or other suitable material to avoid risk of fire because of overheating.

The mode of operation is as follows: The vessels D are charged with any desired fluid or fluids, which are, preferably, antiseptic and of such a character that the antiseptic agents in the fluid are sufficiently volatile to pass off in the vapor. Different kinds of fluids may be used in the vessels, and in some cases water only may prove desirable. After charging the vessels they are placed in position and the grate F or its equivalent also fixed in place. The heat-producing agent, preferably charcoal, is then placed upon the grate, and proper means for igniting the same is provided. (If the charcoal is slightly saturated with alcohol, it will serve the purpose satisfactorily.) The section B is then closed, and the shelves H and supporting-rod K are placed in position. Any desired dry or partially-dry fumigating agent, mixture, or compound—as, for example, sulfur—is then deposited upon the shelves and the top C closed. The device is then ready for use and is placed in the room or place to be fumigated and the charcoal ignited. When the coal or heating medium is sufficiently ignited, the rod K is withdrawn, and the shelves swinging downward discharge their contents upon the heating medium. The heat causes a rapid evaporation of the liquid, and the fumes arising from the sulfur and charcoal or the substances substituted are mixed with the vapors arising from the fluids. The antiseptic results are thus accomplished by the combination of both dry fumigating and vapor disinfecting, and the best features of each system are retained and applied in a manner to accomplish the best results.

The device is simple and economical in its construction and safe, effective, and economical in its operation.

In Figs. 6 and 7 the vessels D are provided with the coil-pipe R, which acts as a grate to sustain the heating medium, and thus provides for the more rapid heating and evaporation of the fluid and a consequent circulation through the pipes.

In Fig. 8 the two vessels D are united by the pipe-sections S, which act, as before, to aid in the rapid evaporation of the liquid. The vessels and pipe-grate are thus inserted into the fire-box as a whole. The grate F, if desired, may be removed before the vessels are placed in the box, as it may not be needed. The same may be true in the form shown in Figs. 6 and 7.

In Fig. 9 the vessel D is provided with a coil of pipe I, which extends outward from the vessel to form what is termed a "water front or back," the heating medium resting against the pipe serving to more rapidly evaporate the fluid.

In Fig. 10 is shown a top plan of the form shown in Fig. 9 when in position.

In Figs. 11 and 12 the vessel D is made L-shaped, so that the two vessels will completely surround the fire. The several grate pipe-sections T aid in the rapid evaporation of the fluid.

In Fig. 13 is shown a single vessel D, which, if preferred, may be divided into several by transverse walls. The grate W may be of pipe-sections, if preferred.

It is obvious that after pointing out the advantages of my invention many changes may be made in the arrangement and construction of the means pointed out and still retain the advantages named.

If dry fumigation is desired at any time—as, for example, for the purpose of destroying weavil or other vermin—the device may easily be arranged for such purpose by simply removing the vessels and putting in a full length grate, or, if preferred, a full length grate may be used at all times, the vessels resting upon it.

If the vapors are the principal object in view, any simple heating medium may be used and the sulfur or its substitute or equivalent may be dispensed with.

Having thus described my invention, what I claim as new, and desire to secure by Letters Patent, is—

1. In a fumigator, the combination of a fire-box having an outlet for fumes produced therein by the combustion of a fumigating agent, a grate by which said agent is supported during its combustion, a support for the agent above the grate on which it is temporarily placed and from which the agent may be delivered to the grate, and a vessel having a vapor-outlet and exposed to the fire within the fire-box, substantially as and for the purpose described.

2. In a fumigator, the fire-box and the swinging shelves, arranged to deposit their contents upon the fire, in combination with one or more vessels adapted to contain liquid, arranged in proximity to the fire-box, whereby the heat from the fire will cause the rapid evaporation of the liquid, substantially as and for the purpose shown.

3. In a fumigator, the fire-box, the swinging shelves, a retaining device adapted to temporarily hold the shelves in horizontal position and means for releasing the shelves to discharge their contents into the fire-box, in combination with one or more vessels adapted to contain liquid, arranged to form the walls to the fire-box, whereby the heat from the fire will cause the rapid evaporation of the liquid, substantially as and for the purpose set forth.

4. In a fumigator, the fire-box, the grate, and means for conducting air beneath the grate, in combination with one or more sustaining-shelves adapted to sustain the fumigating agent and arranged to discharge the same into the fire-box, substantially as and for the purpose specified.

5. In a fumigator, the fire-box having an outlet for fumes produced by the combustion of a fumigating agent, in combination with one or more removable vessels adapted to discharge fumes or vapors to commingle with the products of combustion of the fire-box, and placed in the fire-box to form part of the fire-wall thereof, substantially as and for the purpose shown.

6. In a fumigator, the combination of a fire-box, and one or more vessels provided with pipe-sections arranged in the fire-box, whereby the contents are subjected to heat, substantially as and for the purpose set forth.

LEWIS W. COCK.

Witnesses:
L. A. GARDINER,
A. M. BELFIELD.